(12) United States Patent
Deeba et al.

(10) Patent No.: US 6,764,665 B2
(45) Date of Patent: Jul. 20, 2004

(54) LAYERED CATALYST COMPOSITE

(75) Inventors: Michel Deeba, East Brunswick, NJ (US); John J. Steger, Pittstown, NJ (US); Harold N. Rabinowitz, Upper Montclair, NJ (US); John S. Foong, Piscataway, NJ (US)

(73) Assignee: Engelhard Corporation, Iselin, NJ (US)

( * ) Notice: Subject to any disclaimer, the term of this patent is extended or adjusted under 35 U.S.C. 154(b) by 271 days.

(21) Appl. No.: 10/003,663

(22) Filed: Oct. 26, 2001

(65) Prior Publication Data

US 2003/0100447 A1 May 29, 2003

(51) Int. Cl.$^7$ .......................... B01D 53/56; B01D 23/40
(52) U.S. Cl. ................. 423/239.1; 423/213.5; 502/302; 502/303; 502/304; 502/326; 502/334; 502/339
(58) Field of Search .................... 423/213.5, 239.1, 423/245.1; 502/302, 303, 304, 326, 333, 334, 339

(56) References Cited

U.S. PATENT DOCUMENTS

| | | |
|---|---|---|
| 4,335,023 A | 6/1982 | Dettling et al. ......... 252/466 PT |
| 4,868,148 A | 9/1989 | Henk et al. ................. 502/303 |
| 5,057,483 A | 10/1991 | Wan ........................... 502/304 |
| 5,063,192 A | 11/1991 | Murakami et al. .......... 502/303 |
| 5,212,142 A | 5/1993 | Dettling ...................... 502/304 |
| 5,459,119 A | * 10/1995 | Abe et al. ................... 502/326 |
| 5,597,771 A | 1/1997 | Hu et al. .................... 502/304 |
| 5,888,464 A | 3/1999 | Wu et al. ................. 423/213.5 |
| 5,948,377 A | 9/1999 | Sung ........................ 423/213.5 |
| 5,948,723 A | 9/1999 | Sung .......................... 502/303 |
| 5,981,427 A | 11/1999 | Sung et al. ................. 502/325 |
| 5,989,507 A | 11/1999 | Sung et al. .............. 423/213.5 |
| 6,087,298 A | 7/2000 | Sung et al. ................. 502/333 |
| 6,248,688 B1 | 6/2001 | Wu et al. .................... 502/302 |

FOREIGN PATENT DOCUMENTS

| | | | |
|---|---|---|---|
| EP | 0 905 354 A2 | 3/1999 | ............. F01N/3/08 |
| EP | 0 992 276 A1 | 12/2000 | .......... B01D/53/94 |
| WO | WO 95/00235 | 5/1995 | .......... B01D/53/36 |
| WO | WO 95/35152 | 12/1995 | .......... B01D/53/94 |
| WO | WO 99/00177 | 7/1999 | .......... B01D/53/94 |

* cited by examiner

Primary Examiner—Stanley S. Silverman
Assistant Examiner—Maribel Medina
(74) Attorney, Agent, or Firm—Richard A. Negin

(57) ABSTRACT

The present invention relates to a layered catalyst composite of the type generally referred to as a three-way conversion catalyst having the capability of simultaneously catalyzing the oxidation of hydrocarbons and carbon monoxide and the reduction of nitrogen oxides. The structure of the layered catalyst composite of the present invention is designed wherein there are three layers in conjunction with a carrier: a first layer deposited on the carrier and comprising a high surface area refractory metal oxide; a second layer deposited on the first layer and comprising palladium and/or platinum deposited on a high surface area refractory metal oxide, and having substantially no oxygen storage components; and a third layer deposited on the second layer and comprising platinum and/or rhodium as well as an oxygen storage component, deposited on a high surface area refractory metal oxide.

62 Claims, No Drawings

LAYERED CATALYST COMPOSITE

BACKGROUND OF THE INVENTION

1. Field of the Invention

The present invention relates to a layered catalyst composite useful for the treatment of gases to reduce the level of contaminants contained therein. More specifically, the present invention is concerned with catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides.

2. Related Art

Three-way conversion catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, paladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support The composition can be deposited on a relatively inert carrier such as a honeycomb.

The high surface area alumina support materials, also referred to as "gamma alumina" or "activated alumina," typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is disclosed to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania alkalie earth metal oxides such as baria, calcia or strontia or rare earth metal oxides, such as ceria, lanthana and mixtures of two or more rare earth metal oxides. For example, see C. D. Keith et al., U.S. Pat. No. 4,171,288.

Bulk cerium oxide (ceria) is disclosed to provide an excellent refractory oxide support for platinum group metals other than rhodium, and enables the attainment of highly dispersed, small crystaltites of platinum on the ceria particles, and that the bulk ceria may be stabilized by impregnation with a solution of an aluminum compound, followed by calcination. U.S. Pat. No. 4,714,694 of C. Z. Wan et al., discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. Nos. 4,727,052 and 4,708,946.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The catalyst layer is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc. Oxides of cerium and praseodymium are particularly useful as oxygen storage components.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina-supported catalyst for use on a substrate. The catalyst is stable at high temperatures. The stabilizing material may be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with some calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. No. 4,591,518 discloses a catalyst comprising an alumina support with components deposited thereon consisting essentially of a lanthana component, ceria, an alkali metal oxide and a platinum group metal.

U.S. Pat. No. 4,591,580 discloses an alumina-supported platinum group metal catalyst. The support is sequentially modified to include support stabilization by lanthana or lanthana rich rare earth oxides, double promotion by ceria and alkali metal oxides and optionally nickel oxide.

Palladium-containing catalyst compositions, see, e.g., U.S. Pat. No. 4,624,940, have been found useful for high temperature applications. The combination of lanthanum and barium is found to provide a superior hydrothermal stabilization of alumina which supports the catalytic component, palladium.

U.S. Pat. No. 4,780,447 discloses a catalyst which is capable of controlling HC, CO and $NO_x$ as well as $H_2S$ in emissions from the tailpipe of catalytic converter-equipped automobiles. The use of the oxides of nickel and/or iron is disclosed as a hydrogen sulfide gettering-type of compound.

U.S. Pat. No. 4,965,243 discloses a method to improve thermal stability of a TWC catalyst containing precious metals by incorporating a barium compound and a zirconium compound together with ceria and alumina. This is stated to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound These patents suggest the utility of alkaline earth metals in combination with ceria, zirconias to form a thermally-stable alumina-supported palladium-containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution A co-formed (e.g., co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of a gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal selected from the group consisting of iron, nickel, cobalt and the rare earths, e.g., cerium, lanthanum, neodymium, etc.

U.S. Pat. No. 5,057,483 discloses a catalyst composition suitable for conversion of exhaust gases emanating from an internal combustion engine and includes a catalytic material disposed in two discrete coats on a carrier. The first coat includes a stabilized alumna support on which a first platinum catalytic component is disperse& The first coat also includes bulk ceria and may also include bulk iron oxide, a metal oxide, e.g., bulk nickel oxide, and one or both of baria and zirconia dispersed throughout as a thermal stabilizer. The second coat, which may comprise a top coat overlying the first coat, contains a co-formed, e.g., co-precipitated rare earth oxide-zirconia support on which a first rhodium catalytic component is dispersed, and a second platinum catalytic component dispersed thereon. The second coat may also include a second rhodium catalytic component and optionally, a third platinum catalytic component, dispersed as an activated alumina support.

WO 95/35152 discloses a layered catalyst composite of the TWC type. The composite contains a first layer and a second layer. The first layer comprises a fist support, at least one first palladium component, optionally a minor amount of a platinum component, optionally a first oxygen storage component, optionally a zirconium component, optionally at least one alkaline earth metal component and optionally at least one lanthanum and/or neodymium component. The second layer comprises a second support, a second platinum component, a rhodium component, a diluted second oxygen storage component and optionally a zirconium component.

It is a continuing goal to develop a three-way conversion catalyst system which is inexpensive and stable at the high temperatures generated by an internal combustion engine. At the same time, the system should have the ability to oxidize hydrocarbons and carbon monoxide while reducing nitrogen oxides to nitrogen.

SUMMARY OF THE INVENTION

The present invention relates to a layered catalyst composite of the type generally referred to as a three-way conversion catalyst. These TWC catalysts are polyfunctional in that they have the capability of substantially simultaneously catalyzing the oxidation of hydrocarbons and carbon monoxide and the reduction of nitrogen oxides. The relative layers of the catalyst composite and the specific composition of each such layer provide a stable, economical system. This enables the enhanced oxidation of hydrocarbons and carbon monoxide as well as effective conversion of nitrogen oxide compounds to nitrogen even where palladium is the only noble metal component in the composite.

DETAILED DESCRIPTION OF THE INVENTION

The structure of the layered catalyst composite of the present invention is designed such that there are three layers in the composite, in addition to the carrier. The first layer is interchangeably referred to as the bottom layer and is deposited on the carrier; the second layer is interchangeably referred to as the middle layer and is deposited on the first or bottom layer; the third layer is interchangeably referred to as the top or outer layer and is deposited on the second or middle layer.

The Carrier

The carrier, may be any of those materials typically used for preparing TWC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-$\alpha$ alumina, silicon nitride, zircon mullite, spodumene, alumina-silica magnesia, zircon silicate, sillimanite, magnesium silicates, zircon, petalite, $\alpha$ alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10–25 wt. % of chromium, 3–8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

The First Layer

The first layer which is deposited upon, i.e., coated upon and adhered to, the carrier comprises a high surface area refractory metal oxide such as alumina, silica, titania and zirconia and mixtures thereof. In general, the loading of the first layer upon the carrier is about 0.5 to about 1.5 g/in$^3$. The refractory metal oxide may consist of or contain a mixed oxide such as silica-alumina, aluminosilicates which may be amorphous or crystalline, alumina-zirconia, alumina-chromia, alumna-ceria and the like. The preferred refractory metal oxide comprises gamma alumina having a specific surface area of about 60 to about 300 m$^2$/g. The first layer may further contain 0 to about 30 g/ft$^3$ of platinum as well as 0 to about 0.75 g/in$^3$ of an oxygen storage component. Typically, the oxygen storage component will comprise one or more reducible oxides of one or more rare earth metals. Preferred examples of suitable oxygen storage components include ceria, a mixed oxide of cerium and zirconium and a mixed oxide of cerium, zirconium and neodymium.

The first layer may also contain 0 to 0.3 g/in$^3$ of a stabilizer as well as 0 to 0.3 g/$^3$ of a promoter. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium. Suitable promoters include one or more non-reducible oxides of one or more rare earth metals selected from the group consisting of lanthanum, praseodymium, yttrium, zirconium and mixtures thereof

The Second Layer

The second layer which is deposited upon, i.e., coated upon and adhered to, the first layer comprises palladium and/or platinum deposited on a high surface area refractory metal oxide which may be any of those mentioned above in respect to the first layer. The second layer will have substantially no oxygen storage components and will be present in a loading of about 1.5 to about 2.5 g/in$^3$. Preferably, the metal oxide employed for the second layer comprises gamma alumina having a specific surface area of about 60 to about 300 m$^2$/g and which is present in a loading of about 0.7 to about 2.2 g/in$^3$.

The palladium and platinum will be present in the second layer in a loading of about 20 to about 200 g/ft$^3$, preferably 50 to 150 g/ft$^3$, of palladium and 0 to about 10 g/ft$^3$, preferably 2 to 8 g/ft$^3$, of platinum. The second layer may also contain 0 to about 0.3 g/in$^3$ of a stabilizer as well as 0 to 0.3 g/in$^3$ of a promoter. Suitable stabilizers include one or more non-reducible metal oxides wherein the metal is selected from the group consisting of barium, calcium, magnesium, strontium and mixtures thereof Preferably, the stabilizer comprises one or more oxides of barium and/or strontium. Suitable promoters include one or more non-reducible oxides of one or more rare earth metals selected from the group consisting of lanthanum, praseodymium, yttrium, zirconium and mixtures thereof

The Third Layer

The third layer which is deposited upon, i.e., coated upon and adhered to, the second layer comprises (i) platinum and/or rhodium and (ii) an oxygen storage component, deposited on a high surface area refractory metal oxide. The third layer will be present in a loading of about 0.5 to about 1.5 g/in$^3$. Preferably, the metal oxide employed for the third layer comprises gamma alumina having a specific surface area of about 60 to about 300 m$^2$/g and which is present in a loading of about 0.25 to about 0.75 g/in$^3$.

The platinum and rhodium are present in the third layer in a loading of about 2 to about 20 g/ft$^3$, preferably 5 to 15 g/ft$^3$, of platinum and about 3 to about 15 g/ft$^3$, preferably 6 to 12 g/ft$^3$, of rhodium. The oxygen storage component will be present in the third layer in an amount of about 0.5 to about 1.25 g/in$^3$. Typically the oxygen storage component will comprise one or more reducible oxides of one or more rare earth metals, such as ceria, a mixed oxide of cerium and zirconium and a mixed oxide of cerium, zirconium and neodymium.

The third layer may also contain 0 to about 0.3 g/in$^3$ of a stabilizer comprising one or more non-reducible metal oxides wherein the metal is selected from the group consisting of barium, calcium, magnesium, strontium and mixtures thereof Preferably, the stabilizer comprises one or more oxides of barium and/or strontium. The third layer may further contain 0 to about 0.3 g/in$^3$ of one or more promoters comprising one or more non-reducible oxides of one or more rare earth metals selected from the group consisting of lanthanum, praseodymium, yttrium, zirconium and mixtures thereof.

Preparation of the Layered Catalyst Composite

The layered catalyst composite of the present invention may be readily prepared by processes well known in the prior art. A representative process is set forth below.

The catalyst composite can be readily prepared in layers on a monolithic carrier. For the first layer, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 1.5 g/in$^3$. If it is desired that the first layer contain optional components such as platinum, oxygen storage components, stabilizers and/or promoters, such optional components may be incorporated in the slurry as a mixture of water soluble or water-dispersible compounds or complexes. Thereafter the coated carrier is calcined by heating, e.g., at 500–600° C. for 1∝3 hours.

Typically, the platinum component is utilized in the form of a compound or complex to achieve dispersion of the component on the refractory metal oxide support, e.g., activated alumina. For the purposes of the present invention, the term "platinum component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A preferred method of preparing the first layer of the layered catalyst composite of the invention is to prepare a mixture of a solution of a platinum compound and at least one finely divided, high surface area, refractory metal oxide support, e.g., gamma alumina, which is sufficiently dry to absorb substantially all of the solution to form a slurry. Preferably, the slurry is acidic, having a pH of about 2 to less than 7. The pH of the slurry may be lowered by the addition of a minor amount of an inorganic or organic acid such as hydrochloric or nitric acid, preferably acetic acid, to the slurry. Thereafter, if desired, water-soluble or water-dispersible compounds of oxygen storage components, e.g., cerium-zirconium nitrate, a stabilizer, e.g., barium nitrate, and a promoter, e.g., lanthanum nitrate, may be added to the slurry.

In a particularly preferred embodiment, the slurry is thereafter comminuted to result in substantially all of the solids having particle sizes of less than 20 microns, i.e., 1–15 microns, in an average diameter. The comminution may be accomplished in a ball mill or other similar equipment, and the solids content of the slurry may be, e.g., 20–60 wt. %, preferably 35–45 wt. %.

The second layer may be prepared and deposited upon the first layer in the same manner as described above for deposition of the first layer upon the carrier. However, for the purposes of the present invention, it is essential that substantially no oxygen storage components be present in the slurry employed for the second layer. Other than the exclusion of oxygen storage components from the second layer, the second layer will contain the platinum and/or palladium components and optionally, the stabilizer and promoter components described above.

The third layer may be prepared and deposited upon the second layer in the same manner as that described above for deposition of the first layer upon the carrier. For the purpose of the present invention, it is essential that at least one oxygen storage component of the type described above be present in the third layer along with the platinum and/or rhodium components. The same stabilizer and promoter components described above may optionally be present in the third layer.

The following nonlimiting examples shall serve to illustrate the various embodiments of the present invention. In each of the examples, the carrier was cordierite with dimensions of 4.66 inches length, 3.0 inches width, 6.5 mil thickness and 400 cells per square inch.

EXAMPLE 1

The layered catalyst composite contained a total precious metal loading of 80 g/ft$^3$ of platinum, palladium and rhodium in a ratio of 4:7:1, respectively. The ceria-zirconia oxygen storage component employed in this example had been calcined at 1050° C. for 2 hours.

First Layer

The components present in the first layer were gamma alumina, barium oxide, zirconium oxide, a mixed oxide of cerium and zirconium and platinum at the concentrations of 53%, 4.2%, 37% and 0.67%, respectively, based on the calcined weight of the catalyst. The platinum (22 g/ft$^3$) and the other components in the form of their salts, were impregnated onto the alumina using water as the slurrying vehicle. The aqueous slurry was milled to a particle size of less than 9 microns and coated onto the cordierite carrier. After coating, the carrier plus the first layer was calcined at a temperature of 550° C. for 1 hour.

Second Layer

The components present in the second layer were gamma alumina, barium oxide, zirconium oxide, platinum and palladium at the concentrations of 86%, 6.9%, 4.3%, 0.10% and 2.33%, respectively, based on the calcined weight of the catalyst. The palladium (46.7 g/ft$^3$) and the other components in the form of their salts, were impregnated onto the alumina using water as the slurrying vehicle. There was no ceria-zirconia or any other oxygen storage component present in this slurry. The aqueous slurry was milled to a particle size of less than 9 microns and coated onto the first layer After coating, the carrier plus the first layer and the second layer was calcined at a temperature of 550° C. for 1 hour.

Third Layer

After cooling, the third layer was coated onto the second layer. The components present in the third layer were gamma alumina, rhodium/mixed oxide of cerium and zirconium, zirconium oxide, platinum and rhodium at the concentrations of 18%, 73%, 7.37%, 0.142% and 0.36%, based on the finished calcined weight of the third layer. The catalyst was prepared by impregnating rhodium nitrate onto the mixed oxide of cerium and zirconium (the oxygen storage component), followed by the addition of water and the other components in the form of their salts. The resultant slurry having a solids content of about 42% was then milled to a particle size of less than 9 microns and thereafter coated onto the second layer. The resultant carrier plus first layer, second layer and third layer was then calcined at 550° C.

EXAMPLE 2

The layered catalyst composite contained a total precious metal loading of 80 g/ft$^3$ of platinum, palladium and rhodium in a ratio of 1:10:1, respectively. The ceria-zirconia oxygen storage component employed in this example had been calcined at 1050° C. for 2 hours.

First layer

The components present in the first layer were gamma alumina, barium oxide, zirconium oxide, a mixed oxide of cerium and zirconium, palladium and platinum at the concentrations of 39%, 4.2%, 51%, 0.56% and 0.06%, respectively, based on the calcined weight of the catalyst. The palladium(20 g/ft$^3$) and the other components in the form of their salts, were impregnated onto the alumina using water as the slurrying vehicle. The aqueous slurry having a solids content of about 42% was milled to a particle size of less than 9 microns and coated onto the cordierite carrier. After coating, the carrier plus the first layer was calcined at a temperature of 550° C. for 1 hour.

Second Layer

The components present in the second layer were gamma alumina, barium oxide, zirconium oxide, palladium and platinum at the concentrations of 86%, 6.9%, 4.3%, 0.10% and 2.33%, respectively, based on the calcined weight of the catalyst. The palladium (46 g/ft$^3$) and the other components in the form of their salts, were impregnated onto the alumina using water as the slurrying vehicle. There was no ceria-zirconia or any other oxygen storage component present in this slurry. The aqueous slurry was milled to a particle size of less than 9 microns and coated onto the first layer After coating, the carrier plus the first layer and the second layer was calcined at a temperature of 550° C. for 1 hour.

Third Layer

After cooling, the third layer was coated onto the second layer. The components present the third layer were gamma alumina, rhodium/mixed oxide of cerium and zirconium, zirconium oxide, platinum and rhodium at the concentrations of 18%, 73%, 7.37%, 0.142% and 0.36%, based on the finished calcined weight of the third layer. The catalyst was prepared by impregnating rhodium nitrate onto the mixed oxide of cerium and zirconium (the oxygen storage component), followed by the addition of water and the other components in the form of their salts. The resultant slurry having a solids content of about 42% was then milled to a particle size of less than 9 microns and thereafter coated onto the second layer. The resultant carrier plus first layer, second layer and third layer was then calcined at 550° C.

EXAMPLE 3

This example pertains to the reference catalyst The reference catalyst was a typical three-way conversion catalyst with a total precious metal loading of 80 g/ft$^3$ of platinum, palladium and rhodium in a ratio of 1:10:1, respectively. The ceria-zirconia oxygen storage component employed in this example had been calcined at 1050° C. for 2 hours. The composite consisted of two layers and each layer contained palladium impregnated onto the gamma alumina and the ceria-zirconia oxygen storage component.

Evaluation

Prior to evaluation, the layered catalyst composites of Examples 1–3 were aged on a gasoline engine at 1000° C. for 25 hours. The evaluations were performed on the engine at lambda=1.0 using the US FTP-75 testing procedure. The total amount of hydrocarbons, carbon monoxide and nitrogen oxides was measured by collecting three bags and the weighed average was calculated. The results of the evaluations are set forth in Table I below.

TABLE I

| Improvement Example | Total PM g/ft$^3$ | Pt/Pd/Rh Ratio | Bag 1 g/mile | Bag 2 g/mile | FTP Total g/mile | Bag 2% over Reference |
|---|---|---|---|---|---|---|
| 1 | 80 | 4:07:01 | 0.415 | 0.043 | 0.264 | 37 |
| 2 | 80 | 1:10:01 | 0.448 | 0.035 | 0.275 | 49 |
| 3 | 80 | 1:10:01 | 0.435 | 0.0685 | 0.294 | — |

The results of the evaluation, as shown in Table I, are quite revealing. Firstly, it is to be noted the layered catalyst composite of Example 1 exhibited a significant improvement in the reduction of hydrocarbons as compared to Example 3 (the reference), notwithstanding that the amount of palladium in the composite was only a fraction of that contained in Example 3. The prior art is replete with teachings which state that a generous amount of palladium is required in order to significantly reduce hydrocarbon emissions. However, these results refute such teachings.

Secondly, as seen in Table I, the layered catalyst composite of Example 2 as compared to Example 3 (the reference) exhibited a dramatic 49% improvement in reduction of hydrocarbon emissions.

Based on the results shown in Table I, it is clear that the layered catalyst composite of the present invention will produce significant improvements in the reduction of hydrocarbon emissions, even at very low levels of palladium.

EXAMPLE 4

First Layer

The components present in the first layer were 56.1% of gamma alumina, 24% of a mixed oxide of cerium and zirconium, 7% of ceria, 8.4% of cordierite and 5% of a mixture of alkaline earth oxides consisting of equal amounts of Ba, Sr, Nd and Pr oxides. The foregoing components, present as a solid mixture, were mixed with de-ionized water and acetic acid to form a slurry having a solids content of about 40% and a pH of about 3.5. The slurry was then milled to reduce 90% of the particles to a particle size of less than 6 microns. The finally slurry was obtained by adjusting the pH to about 3.5 and a solids content suitable for coating a ceramic monolithic substrate at a loading of 1.1 g/in$^3$ volume of the substrate. The final slurry was applied to the substrate, followed by drying at 105° C. for 2 hours and calcination at 550° C. for 1 hour.

Second Layer

The second layer consisted of 86.3% of gamma alumina, 5.2% of zirconia, 4.3% of baria 4.1% of palladium and 0.1% of platinum. The palladium was utilized in the form of an aqueous solution of palladium nitrate and the platinum was utilized in the form of an aqueous amine solution. The solutions were impregnated onto the gamma alumina; thereafter, de-ionized water was added along with the remaining components to form a slurry having a solids content of about 42%. The pH of the slurry was adjusted to about 4 and the slurry was thereafter milled to reduce 90% of the particles to a particle size of 6–8 microns. The slurry was then applied to the substrate containing the first layer and subsequently dried and calcined as described for the first layer.

Third Layer

The third layer consisted of 14.2% of gamma alumina, 56.9% of a mixed oxide of cerium and zirconium, 21.3% of zirconia, 0.1% of platinum and 0.21% of rhodium. The latter two components were utilized in the form of aqueous solutions which were separately impregnated into the gamma alumina. A final slurry of the components was then prepared as described above and it was then coated onto the second layer and subsequently dried and calcined as described above.

EXAMPLE 5

This example pertains to a reference catalyst which was prepared in the same manner as Example 4, except that an oxygen storage component consisting of a mixed oxide of cerium and zirconium was present in the second layer.

The catalyst composites of Examples 4 and 5 were aged in a rapid-aging cycle at a catalyst bed temperature of 1000° C. for 80 hours. Evaluations of the catalyst composites were then carried out on an engine test bench in accordance with the Federal Test Procedure. The results of the evaluations are set forth in Table II below.

TABLE II

| FTP total emissions (g/mile) | HC | CO | $NO_x$ |
|---|---|---|---|
| Example 4 | 0.12 | 2.13 | 0.04 |
| Example 5 | 0.14 | 2.14 | 0.04 |

As may be seen from the results, in Table II, elimination of the oxygen storage component from the second layer of the catalyst composite resulted in a significant reduction m hydrocarbon emissions while maintaining acceptable levels of reduction in carbon monoxide and nitrogen oxides emissions.

What is claimed is:

1. A layered catalyst composite comprising:
  (a) a carrier;
  (b) a first layer deposited on the carrier, said first layer comprising a high surface area refractory metal oxide;
  (c) a second layer deposited on the first layer, said second layer comprising palladium and/or platinum deposited on a high surface area refactory metal oxide, and having no oxygen storage components; and
  (d) a third layer deposited on the second layer, said third layer comprising: (i) platinum and/or rhodium and (ii) an oxygen storage component, deposited on a high surface area refractory metal oxide.

2. The composite of claim 1 wherein the first layer is deposited on the carrier in a loading of about 0.5 to about 1.5 g/in$^3$.

3. The composite of claim 1 wherein the second layer is deposited on the first layer in a loading of about 1.5 to about 2.5 g/in$^3$.

4. The composite of claim 1 wherein the third layer is deposited on the second layer in a loading of about 0.5 to about 1.5 g/in$^3$.

5. The composite of claim 1 wherein the metal oxide comprises gamma alumina having a specific surface area of about 60 to about 300 m$^2$/g.

6. The composite of claim 5 wherein the gamma alumina is present in the first layer in a loading of about 0.5 to about 1.5 g/in$^3$.

7. The composite of claim 5 wherein the gamma alumina is present in the second layer in a loading of about 0.7 to about 2.2 g/$^3$.

8. The composite of claim 5 wherein the gamma alumina is present in the third layer in a loading of about 0.25 to about 0.75 g/in$^3$.

9. The composite of claim 1 wherein the first layer further comprises 0 to about 30 g/ft$^3$ of platinum.

10. The composite of claim 1 wherein the first layer further comprises 0 to about 0.75 g/in$^3$ of an oxygen storage component.

11. The composite of claim 10 wherein the oxygen storage component comprises one or more reducible oxides of one or more rare earth metals.

12. The composite of claim 11 wherein the oxygen storage component is selected from the group consisting of ceria, a mixed oxide of cerium and zirconium and a mixed oxide of cerium, zirconium and neodymium.

13. The composite of claim 1 wherein the first layer further comprises 0 to about 0.3 g/in$^3$ of a stabilizer comprising one or more non-reducible metal oxides wherein the metal is selected from the group consisting of barium, calcium, magnesium, strontium, and mixtures thereof.

14. The composite of claim 13 wherein the stabilizer comprises one or more oxides of barium and/or strontium.

15. The composite of claim 1 wherein the first layer further comprises 0 to about 0.3 g/in$^3$ of one or more promoters comprising one or more non-reducible oxides of one or more rare earth metals.

16. The composite of claim 15 wherein the rare earth metal is selected from the group consisting of lanthanum, praseodymium, yttrium, zirconium and mixtures thereof.

17. The composite of claim 1 wherein the palladium and platinum are present in the second layer in a loading of about 20 to about 200 g/ft$^3$ of palladium and 0 to about 10 g/ft$^3$ of platinum.

18. The composite of claim 17 wherein the palladium and platinum are present in the second layer in a loading of 50 to 150 g/ft$^3$ of palladium and 2 to 8 g/ft$^3$ of platinum.

19. The composite of claim 1 wherein the second layer further comprises 0 to about 0.3 g/in$^3$ of a stabilizer comprising one or more non-reducible metal oxides wherein the metal is selected from the group consisting of barium, calcium, magnesium, strontium and mixtures thereof.

20. The composite of claim 19 wherein the stabilizer comprises one or more oxides of barium and/or strontium.

21. The composite of claim 1 wherein the second layer further comprises 0 to about 0.3 g/in$^3$ of one or more promoters comprising one or more non-reducible oxides of one or more rare earth metals.

22. The composite of claim 21 wherein the rare earth metal is selected from the group consisting of lanthanum, praseodymium, yttrium, zirconium and mixtures thereof.

23. The composite of claim 1 wherein the platinum and rhodium are present in the third layer in a loading of about 2 to about 20 g/ft$^3$ of platinum and about 3 to about 15 g/ft$^3$ of rhodium.

24. The composite of claim 23 wherein the platinum and rhodium are present in the third layer in a loading of 5 to 15 g/ft$^3$ of platinum and 6 to 12 g/ft$^3$ of rhodium.

25. The composite of claim 1 wherein the oxygen storage component is present in the third layer in an amount of about 0.5 to about 1.25 g/in$^3$.

26. The composite of claim 25 wherein the oxygen storage component comprises one or more reducible oxides of one or more rare earth metals.

27. The composite of claim 26 wherein the oxygen storage component is selected from the group consisting of ceria, a mixed oxide of cerium and zirconium and a mixed oxide of cerium, zirconium and neodymium.

28. The composite of claim 1 wherein the third layer further comprises 0 to about 0.3 g/in$^3$ of a stabilizer comprising one or more non-reducible metal oxides wherein the metal is selected from the group consisting of barium, calcium, magnesium, strontium and mixtures thereof.

29. The composite of claim 28 wherein the stabilizer comprises one or more oxides of barium and/or strontium.

30. The composite of claim 1 wherein the third layer comprises 0 to about 0.3 g/in$^3$ of one or more promoters comprising one or more non-reducible oxides of one or more rare earth metals.

31. The composite of claim 30 wherein the rare earth metal is selected from the group consisting of lanthanum, praseodymium, yttrium, zirconium and mixtures thereof.

32. A method for treating a gas comprising hydrocarbons, carbon monoxide and nitrogen oxides which comprises flowing the gas to a catalyst member, and catalytically oxidizing the hydrocarbons and carbon monoxide and catalytically reducing the nitrogen oxides in the gas in the presence of the catalyst member, said catalyst member comprising a layered catalyst composite comprising:
(a) a carrier;
(b) a first layer deposited on the earner, said first layer comprising a high surface area refractory metal oxide;
(c) a second layer deposited on the first layer, said second layer comprising palladium and/or platinum deposited on a high surface area refractory metal oxide, and having no oxygen storage components; and
(d) a third layer deposited on the second layer, said third layer comprising: (i) platinum and/or rhodium and (ii) an oxygen storage component, deposited on a high surface area refractory metal oxide.

33. The method of claim 32 wherein the first layer is deposited on the carrier in a loading of about 0.5 to about 1.5 g/in$^3$.

34. The method of claim 32 wherein the second layer is deposited on the first layer in a loading of about 1.5 to about 2.5 g/in$^3$.

35. The method of claim 32 wherein the third layer is deposited on the second layer in a loading of about 0.5 to about 1.5 g/$^3$.

36. The method of claim 32 wherein the metal oxide comprises gamma alumina having a specific surface area of about 60 to about 300 m$^2$/g.

37. The method of claim 36 wherein the gamma alumina is present in the first layer in a loading of about 0.5 to about 1.5 g/in$^3$.

38. The method of claim 36 wherein the gamma alumina is present in the second layer in a loading of about 0.7 to about 2.2 g/in$^3$.

39. The method of claim 36 wherein the gamma alumina is present in the third layer in a loading of about 0.25 to about 0.75 g/in$^3$.

40. The method of claim 32 wherein the first layer further comprises 0 to about 30 g/ft$^3$ of platinum.

41. The method of claim 32 wherein the first layer further comprises 0 to about 0.75 g/in$^3$ of an oxygen storage component.

42. The method of claim 41 wherein the oxygen storage component comprises one or more reducible oxides of one or more rare earth metals.

43. The method of claim 42 wherein the oxygen storage component is selected from the group consisting of ceria, a mixed oxide of cerium and zirconium and a mixed oxide of cerium, zirconium and neodymium.

44. The method of claim 32 wherein the palladium and platinum are present in the second layer in a loading of about 20 to about 200 g/ft$^3$ of palladium and 0 to about 10 g/ft$^3$ of platinum.

45. The method of claim 44 wherein the palladium and platinum are present in the second layer in a loading of 50 to 150 g/ft$^3$ of palladium and 2 to 8 g/ft$^3$ of platinum.

46. The method of claim 32 wherein the first layer further comprises 0 to about 0.3 g/in$^3$ of a stablizer comprisisng one or more non-reducible metal oxides wherein the metal is selected from the group consisting of barium, calcium, magnesium, strontium and mixtures thereof.

47. The method of claim 46 wherein the stabilizer comprises one or more oxides of barium and/or strontium.

48. The method of claim 32 wherein the first layer further comprises 0 to about 0.3 g/in$^3$ of one or more promoters comprising one or more non-reducible oxides of one or more rare earth metals.

49. The method of claim 48 wherein the rare earth metal is selected from the group consisting of lanthanum, praseodymium, yttrium, zirconium and mixtures thereof.

50. The method of claim 32 wherein the second layer further comprises 0 to about 0.3 g/in$^3$ of a stabilizer comprising one or more non-reducible metal oxides wherein the metal is selected from the group consisting of barium, calcium, magnesium, strontium and mixtures thereof.

51. The method of claim 50 wherein the stabilizer comprises one or more oxides of barium and/or strontium.

52. The method of claim 32 wherein the second layer further comprises 0 to about 0.3 g/in$^3$ of one or more promoters comprising one or more non-reducible oxides of one or more rare earth metals.

53. The method of claim 52 wherein the rare earth metal is selected from the group consisting of lanthanum, praseodymium, yttrium, zirconium and mixtures thereof.

54. The method of claim 32 wherein the platinum and rhodium are present in the third layer in a loading of about 2 to about 20 g/ft$^3$ of platinum and about 3 to about 15 g/ft$^3$ of rhodium.

55. The method of claim 54 wherein the platinum and rhodium are present in the third layer in a loading of 5 to 15 g/ft$^3$ of platinum and 6 to 12 g/ft$^3$ of rhodium.

56. The method of claim 32 wherein the oxygen storage component is present in the third layer in an amount of about 0.5 to about 1.25 g/$^3$.

57. The method of claim 56 wherein the oxygen storage component comprises one or more reducible oxides of one or more rare earth metals.

58. The method of claim 57 wherein the oxygen storage component is selected from the group consisting of ceria, a mixed oxide of cerium and zirconium and a mixed oxide of cerium, zirconium and neodymium.

59. The method of claim 32 wherein the third layer further comprises 0 to about 0.3 g/in$^3$ of a stabilizer comprising one or more non-reducible metal oxides wherein the metal is selected from the group consisting of barium, calcium, magnesium, strontium and mixtures thereof.

60. The method of claim 59 wherein the stabilizer comprises one or more oxides of barium and/or strontium.

61. The method of claim 32 wherein the third layer comprises 0 to about 0.3 g/in$^3$ of one or more promoters comprising one or more non-reducible oxides of one or more rare earth metals.

62. The method of claim 61 wherein the rare earth metal is selected from the group consisting of lanthanum, praseodymium, yttrium, zirconium and mixtures thereof.

* * * * *

UNITED STATES PATENT AND TRADEMARK OFFICE
CERTIFICATE OF CORRECTION

PATENT NO. : 6,764,665 B2
DATED : July 20, 2004
INVENTOR(S) : Michel Deeba, John J. Steger, Harold N. Rabinowitz and John S. Foong It is certified that error appears in the above-identified patent and that said Letters Patent is hereby corrected as shown below:

Column 12,
Line 12, after "2.2" delete "$g/^3$," and add -- $g/^3 in$ --.

Column 13,
Line 48, after "1.5" delete "$g/^3$," and add -- $g/^3 in$ --.

Column 14,
Line 47, after "1.25" delete "$g/^3$," and add -- $g/^3 in$ --.

Signed and Sealed this

Thirtieth Day of November, 2004

JON W. DUDAS
*Director of the United States Patent and Trademark Office*